US011925902B2

(12) United States Patent
Klaehn et al.

(10) Patent No.: US 11,925,902 B2
(45) Date of Patent: Mar. 12, 2024

(54) THERMALLY REFLECTIVE MEMBRANE APPARATUSES, AND RELATED FLUID TREATMENT SYSTEMS AND METHODS

(71) Applicant: Battelle Energy Alliance, LLC, Idaho Falls, ID (US)

(72) Inventors: John R. Klaehn, Idaho Falls, ID (US); Christopher J. Orme, Firth, ID (US); Aaron D. Wilson, Idaho Falls, ID (US); Birendra Adhikari, Ammon, ID (US); Frederick F. Stewart, Idaho Falls, ID (US); Seth W. Snyder, Ammon, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 315 days.

(21) Appl. No.: 17/009,421

(22) Filed: Sep. 1, 2020

(65) Prior Publication Data
US 2021/0060492 A1    Mar. 4, 2021

Related U.S. Application Data

(60) Provisional application No. 62/895,604, filed on Sep. 4, 2019.

(51) Int. Cl.
*B01D 61/36* (2006.01)
*B01D 69/02* (2006.01)
*B01D 69/12* (2006.01)

(52) U.S. Cl.
CPC ........... *B01D 61/364* (2013.01); *B01D 69/02* (2013.01); *B01D 69/12* (2013.01);
(Continued)

(58) Field of Classification Search
CPC ...... B01D 61/364; B01D 69/02; B01D 69/12; B01D 2313/22; B01D 2313/221;
(Continued)

(56) References Cited

U.S. PATENT DOCUMENTS

| 2015/0353379 | A1* | 12/2015 | Lee | C02F 1/043 203/21 |
| 2017/0246592 | A1* | 8/2017 | Li | B82Y 30/00 |
| 2019/0299164 | A1* | 10/2019 | Khalifa | B01D 61/368 |

OTHER PUBLICATIONS

Politano, Antonio & Di Profio, Gianluca & Sanna, Vanna & E, Curcio. (2017). Thermoplasmonic Membrane Distillation. Chemical Engineering Transactions. 60. 301-306. 10.3303/CET1760051. (Year: 2017).*

(Continued)

*Primary Examiner* — Pranav N Patel
(74) *Attorney, Agent, or Firm* — TraskBritt

(57) ABSTRACT

A thermally reflective membrane apparatus comprises a housing structure, and a thermally reflective membrane contained within the housing structure. The thermally reflective membrane comprises a semipermeable structure, and a porous, thermally reflective structure physically contacting the semipermeable structure. The porous, thermally reflective structure comprises discrete thermally reflective particles, and a binder material coupling the discrete thermally reflective particles to one another and the semipermeable structure. A fluid treatment system and method of treating a fluid are also described.

20 Claims, 4 Drawing Sheets

(52) U.S. Cl.
CPC .... *B01D 2313/22* (2013.01); *B01D 2313/221* (2022.08); *B01D 2313/36* (2013.01); *B01D 2323/46* (2013.01); *B01D 2325/22* (2013.01); *B01D 2325/38* (2013.01)

(58) Field of Classification Search
CPC ............ B01D 2313/36; B01D 2323/46; B01D 2325/22; B01D 2325/38
See application file for complete search history.

(56) References Cited

OTHER PUBLICATIONS

A Politano et al 2016 J. Phys.: Condens. Matter 28 363003 (12pp). (Year: 2016).*
Wu et al., J. Mater. Chem. A, 2017, 5, 23712. (Year: 2017).*
Yong Zhang, Kuiling Li, Lie Liu, Kunpeng Wang, Jun Xiang, Deyin Hou, Jun Wang, Titanium nitride nanoparticle embedded membrane for photothermal membrane distillation, Chemosphere, vol. 256, Oct. 2020, 127053. (Year: 2020).*
Driolio, "Membrane Distillation", MDPI, Applied Sciences, 2017, 134 pages.
Ryu et al., "Polydopamine Surface Chemistry: A Decade of Discovery", ACS Appl. Mater. Interfaces 2018, 10, pp. 7523-7540.
Widodo et al., "Membrane separation for non-aqueous solution", IOP Conf. Series: Materials Science and Engineering 285 (2018) 012008, 10 pages.

* cited by examiner

THERMALLY REFLECTIVE MEMBRANE APPARATUSES, AND RELATED FLUID TREATMENT SYSTEMS AND METHODS

CROSS-REFERENCE TO RELATED APPLICATION

This application claims the benefit under 35 U.S.C. § 119(e) of U.S. Provisional Patent Application Ser. No. 62/895,604, filed Sep. 4, 2019, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates to thermally reflective membrane apparatuses, and to related fluid treatment systems and methods.

BACKGROUND

Various industries require energy efficient methods, systems, and apparatuses for treating a fluid (e.g., a liquid fluid, a gaseous fluid) to remove one or more materials (e.g., liquid material(s), gaseous material(s)) of the fluid from one or more other materials (e.g., other liquid material(s), other gaseous material(s)) of the fluid.

A common membrane separation process for liquid fluids (e.g., solutions, such as aqueous solutions) is reverse osmosis (RO), in which a liquid material (e.g., liquid water, such as liquid water solvent) of a feed liquid (e.g., a feed solution) is separated from other materials (e.g., solutes, such as dissolved solids) of the feed liquid by application of pressure that overcomes osmotic pressure of the feed liquid and drives the liquid material of the feed liquid through an RO membrane. However, the pressure to overcome the osmotic pressure of the feed liquid can be substantial (e.g., greater than 50 atmospheres (atm)), resulting in significant equipment and energy costs. In addition, the application of pressure often exacerbates RO membrane fouling by inorganic materials and organic materials.

Another common membrane separation process for liquid fluids that alleviates many of the pressure-related problems of RO is membrane distillation (MD). MD is a thermally-driven separation process employing a semipermeable membrane configured to retain liquid phases while gaseous (e.g., vapor) phases are transported therethrough using partial vapor pressure differences resulting from temperature differences between opposing sides of the semipermeable membrane. However, conventional MD processes may suffer from heat transfer (e.g., heat losses, such as heat losses through the microporous membrane) that can impede mass transport through the semipermeable membrane and that can negatively impact the energy efficiency of such conventional MD processes.

It would be desirable to have new apparatuses, systems, and method for treating a fluid, such as to selectively remove one or more materials of the fluid from one or more other materials of the fluid. It would further be desirable if the new apparatuses, systems, and methods facilitated enhanced energy and separation efficiency, and were relatively inexpensive and simple in operation.

BRIEF SUMMARY

Embodiments described herein include thermally reflective membrane apparatuses, and related fluid treatment systems and methods. In accordance with one embodiment described herein, a thermally reflective membrane apparatus comprises a housing structure, and a thermally reflective membrane contained within the housing structure. The thermally reflective membrane comprises a semipermeable structure, and a porous, thermally reflective structure physically contacting the semipermeable structure. The porous, thermally reflective structure comprises discrete thermally reflective particles, and a binder material coupling the discrete thermally reflective particles to one another and the semipermeable structure.

In additional embodiments, a fluid treatment system comprises a feed fluid source, a heating apparatus, and a thermally reflective membrane apparatus. The feed fluid source is configured to produce a feed fluid stream comprising multiple materials. The heating apparatus is configured and positioned to receive the feed fluid stream from the feed fluid source and to heat the feed fluid stream. The thermally reflective membrane apparatus is downstream of the feed fluid source and the heating apparatus, and comprises a housing structure, and a thermally reflective membrane. The thermally reflective membrane is positioned between a first region and a second region of an internal chamber of the housing structure, and comprises a semipermeable structure, and a porous, thermally reflective structure. The porous, thermally reflective structure physically contacts the semipermeable structure and comprises discrete thermally reflective particles, and a binder material coupling the discrete thermally reflective particles to one another and the semipermeable structure.

In further embodiments, a method of treating a fluid comprises introducing a feed fluid stream comprising multiple materials to a first side of a thermally reflective membrane comprising a semipermeable structure and a porous, thermally reflective structure. The first side of the thermally reflective membrane has a greater temperature than a second, opposing side of the thermally reflective membrane. One or more of the multiple materials of the feed fluid stream are transferred through the thermally reflective membrane and to the second, opposing side of the thermally reflective membrane using membrane distillation.

DETAILED DESCRIPTION

Figure 1:
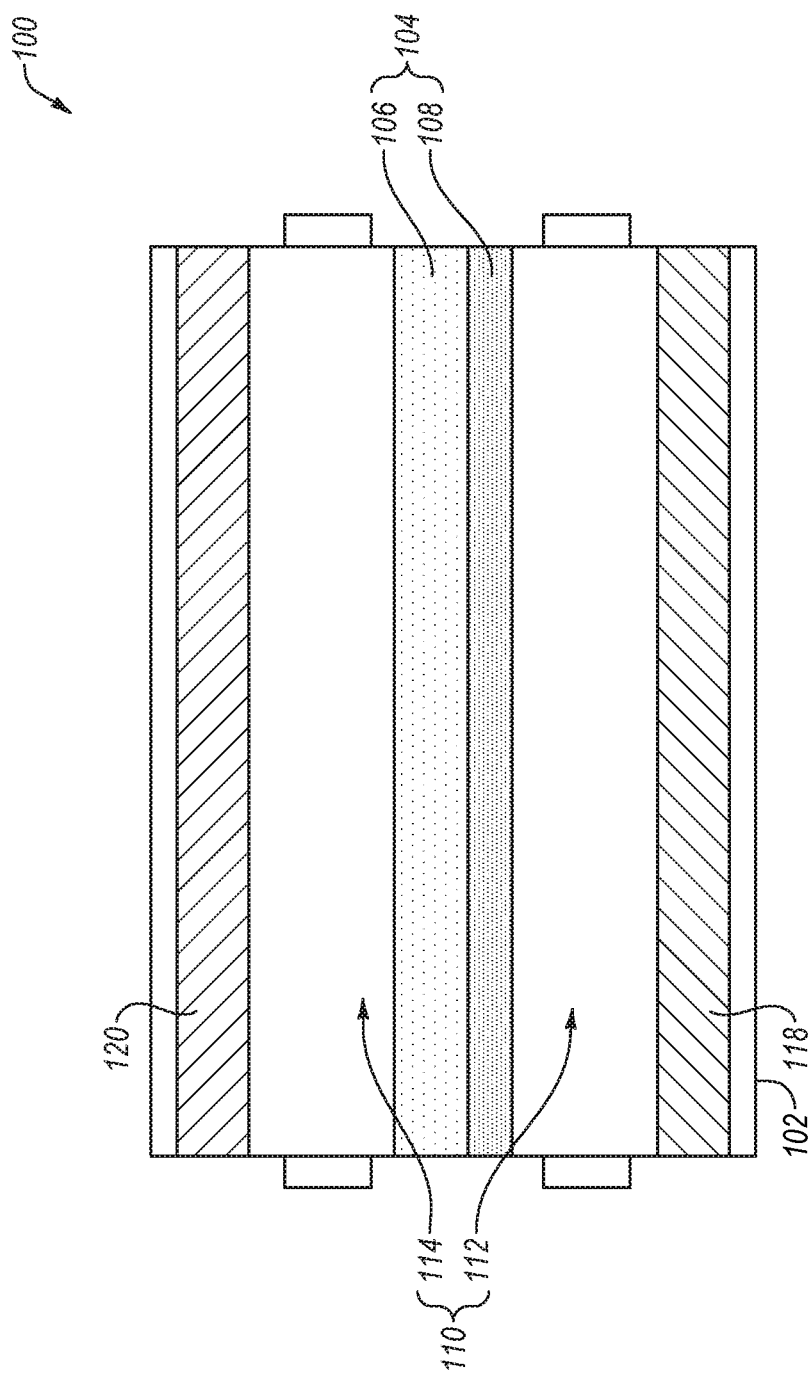
FIG. 1 is a simplified cross-sectional view of a thermally reflective membrane apparatus, in accordance with an embodiment of the disclosure.

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the application are for illustrative purposes only, and are not meant to be actual views of any particular material, device, or system.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped, etc.) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, orientation, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "compatible" means that a material does not undesirably react, decompose, or absorb another material, and also that the material does not undesirably impair the chemical and/or mechanical properties of the another material.

Referring to FIG. 1, a thermally reflective (TR) membrane apparatus 100 includes at least one housing structure 102 and at least one TR membrane 104 within the housing structure 102. The TR membrane 104 includes at least one semipermeable structure 106 and at least one TR structure 108 on, over, and/or within the semipermeable structure 106. Optionally, the TR membrane apparatus 100 may further include one or more (e.g., each) of at least one thermal isolation structure 118 and at least one cooling device 120 within and/or coupled to the housing structure 102 and offset from (e.g., spaced apart from) TR membrane 104. If the thermal isolation structure(s) 118 and the cooling device(s) 120 are both included, the TR membrane 104 may be interposed between the thermal isolation structure(s) 118 and the cooling device(s) 120. As described in further detail below, the TR membrane apparatus 100 may be configured and operated to selectively remove one or more material(s) of at least one fluid from one or more other material(s) of the fluid, while also controlling (e.g., limiting, restricting) heat loss through the TR membrane 104 to circumvent thermal equilibrium between opposing sides of the TR membrane 104.

The housing structure 102 of the TR membrane apparatus 100 may exhibit any shape (e.g., a tubular shape, a quadrilateral shape, a spherical shape, a semi-spherical shape, a cylindrical shape, a semi-cylindrical shape, truncated versions thereof, or an irregular shape) and size able to contain (e.g., hold) the TR membrane 104 therein, and to direct the feed fluid stream to a first side of the TR membrane 104, to optionally receive and direct the additional fluid stream to a second, opposing side of the TR membrane 104, and to direct a produced fluid stream and a feed fluid remnants stream away from the TR membrane apparatus 100. The housing structure 102 may be formed of and include any material (e.g., glass, metal, alloy, polymer, ceramic, composite, combinations thereof, etc.) compatible with the operating conditions (e.g., temperatures, pressures, material interactions) of the TR membrane apparatus 100.

As shown in FIG. 1, the housing structure 102 of the TR membrane apparatus 100 may at least partially define at least one (e.g., one, more than one) internal chamber 110 (e.g., internal open volume, internal cavity) at least partially (e.g., substantially) surrounding the TR membrane 104. The TR membrane 104 may serve as a boundary between at least one (e.g., one, more than one) first region 112 (e.g., at least one feed fluid region, at least one feed fluid channel) of the internal chamber 110 configured and positioned to receive feed fluid and to direct feed fluid remnants from the TR membrane apparatus 100, and at least one (e.g., one, more than one) second region 114 (e.g., at least one permeate region, at least one permeate channel) of the internal chamber 110 configured and positioned to optionally receive additional fluid and to direct produced fluid from the TR membrane apparatus 100.

The TR membrane 104 may be coupled to or integral with the housing structure 102. Optionally, at least one additional structure may be configured and positioned to support (e.g., maintain the position of) the TR membrane 104 within the housing structure 102. The TR membrane 104 may exhibit any desired position and any desired orientation within the housing structure 102. By way of non-limiting example, as shown in FIG. 1, the TR membrane 104 may be positioned centrally about and extend parallel to a horizontal axis of the housing structure 102. In additional embodiments, the TR membrane 104 may exhibit one or more of a different position and a different orientation within the housing structure 102. By way of non-limiting example, the TR membrane 104 may be positioned more distal from (e.g., offset from) the horizontal axis of the housing structure 102, and/or may extend non-parallel (e.g., perpendicular to, diagonal to, etc.) to the horizontal axis of the housing structure 102.

The TR membrane 104 is configured to have selective permeability to one or more material(s) of a feed fluid under the operating conditions (e.g., temperatures, pressures, flow rates) of the TR membrane apparatus 100. The TR membrane 104 may have properties (e.g., dimensions, shapes, material compositions, material distributions, material selectivities, porosities) promoting the migration of the material(s) of the feed fluid therethrough and into the second region 114 of the internal chamber 110 of the TR membrane apparatus 100, while impeding (e.g., substantially preventing) the migration of other material(s) of the feed fluid (and material(s) of an additional fluid, if any) therethrough. As described in further detail below, in some embodiments, the TR membrane 104 effectuates the migration of the material(s) of the feed fluid therethrough and into the second region 114 of the internal chamber 110 of the TR membrane apparatus 100 by way of a change in the phase state of the predetermined material(s). For example, one or more portions (e.g., all, less than all) of one or more material(s) (e.g., a solvent, one or more solute(s)) in a liquid phase within the feed fluid may undergo a phase change to a gaseous phase. The TR membrane 104 may be permeable to the gaseous phase of the material(s), while also being substantially impermeable to the liquid phase of the material(s) and substantially impermeable to other material(s) of the feed fluid present in one or more of a liquid phase and a solid phase. As described in further detail below, the configuration of the TR membrane 104 may at least partially depend on the material composition of the feed fluid to be treated by the TR membrane apparatus 100, and the properties of the material(s) of the feed fluid desired to be selectively removed from the other material(s) of the feed fluid.

The TR membrane 104 may exhibit any dimensions and any shape facilitating selective migration of one or more material(s) (e.g., of a feed fluid) within the first region 112 of the internal chamber 110 of the TR membrane apparatus 100 into the second region 114 of the internal chamber 110 of the TR membrane apparatus 100. The dimensions and the shape of the TR membrane 104 may be selected relative the dimensions and the shape of the housing structure 102 such that the TR membrane 104 is substantially contained within boundaries of the housing structure 102, and such that the TR membrane 104 at least partially (e.g., substantially, completely) intervenes between different regions (e.g., the first region 112 and the second region 114) of the internal chamber 110 of the TR membrane apparatus 100. By way of non-limiting example, the TR membrane 104 may at least partially (e.g., substantially) extend (e.g., horizontally extend, vertically extend) between opposing surfaces (e.g., horizontal surfaces, vertical surfaces) of the housing structure 102, and may exhibit one or more of a cubic shape, cuboidal shape, a tubular shape, a tubular spiral shape, a spherical shape, a semi-spherical shape, a cylindrical shape, a semi-cylindrical shape, a conical shape, a triangular prismatic shape, a truncated version of one or more of the foregoing, and irregular shape. As shown in FIG. 1, in some embodiments, the TR membrane 104 exhibits a substantially flat sheet shape extending from a first end of the housing structure 102 to a second, opposing end of the housing structure 102. In such embodiments, the first region 112 of the internal chamber 110 of the TR membrane 104 may be positioned adjacent a first external surface of the TR membrane 104, and the second region 114 of the internal chamber 110 of the TR membrane 104 may be positioned adjacent a second, opposing external surface of the TR membrane 104, or vice versa. In additional embodiments, the TR membrane 104 exhibits a different shape, such as a hollow fiber shape; a tubular shape (e.g., a linear tubular shape; a non-linear tubular shape, such an angled tubular shape, a curved tubular shape); a spiraled shape (e.g., a spiral wound shape), and a honeycomb shape. In such embodiments, the first region 112 of the internal chamber 110 of the TR membrane 104 may be positioned adjacent an external surface of the TR membrane 104, and the second region 114 of the internal chamber 110 of the TR membrane 104 may be positioned adjacent an internal surface of the TR membrane 104, or vice versa.

With continued reference to FIG. 1, the semipermeable structure 106 of the TR membrane 104 is formed of and includes one or more material(s) compatible with the TR structure 108 of the TR membrane 104 and the materials of at least a feed fluid to be received into the first region 112 of the internal chamber 110 of the TR membrane apparatus 100, and selectivity permeable to one or more material(s) desired to be transferred from the feed fluid and into the second region 114 of the internal chamber 110 of the TR membrane apparatus 100. By way of non-limiting example, the semipermeable structure 106 may be formed of and include one or more of a polymer (e.g., a polyolefin, such as a polyethylene (PE), a polypropylene, etc.; a polyamide; a polyphosphazene; a polysulfone; a fluorinated polymer, such as poly(terafluoroethylene) (PTFE), poly(vinylidene fluoride) (PVDF), etc.; a poly(ether ketone); a poly(ether ether ketone); a poly(ether sulfone) (PES); a polydimethylsiloxane; a silicone polymer; a cellulose acetate; etc.), a polymeric composite material, a metal, a metal alloy (e.g., a cobalt-based alloy, an iron-based alloy, a nickel-based alloy, an iron- and nickel-based alloy, a cobalt- and nickel-based alloy, an iron- and cobalt-based alloy, an aluminum-based alloy, a copper-based alloy, a magnesium-based alloy, a titanium-based alloy, a steel, a low-carbon steel, a stainless steel, etc.), a ceramic (e.g., metal carbides, metal nitrides, metal oxides, metal borides, etc.), a ceramic-metal composite material, a two-dimensional material (e.g., a transition metal dichalcogenide (TMDC) having a chemical formula of $MX_2$, where M is a transition metal and X is a chalcogen such as sulfur (S), selenium (Se), or tellurium (Te); graphene; graphene oxide; stanene; phosphorene; hexagonal boron nitride (h-BN); borophene; silicone; graphyne; germanene; germanan; a 2D supracrystal; etc.), or combinations thereof. In some embodiments, the semipermeable structure 106 comprises a hydrophobic material (e.g., a hydrophobic polymer) suitable for membrane distillation (MD). As used herein, the term "hydrophobic" means and includes any material or surface with which water droplets have a contact angle in air of at least 90°, as measured by a contact angle goniometer as described in ASTM Standard D7334-08 (*Standard Practice for Surface Wettability of Coatings, Substrates and Pigments by Advancing Contact Angle Measurement*, ASTM Int'l, West Conshohocken, Pa., 2008), which standard is incorporated herein in its entirety by this reference. By way of non-limiting example, the semipermeable structure 106 may be formed of and include one or more of PVDF, PTFE, PE, and PES.

The semipermeable structure 106 of the TR membrane 104 may be substantially homogeneous or may be substantially heterogeneous. As used herein, the term "homogeneous" means relative amounts of one or more material(s) do not vary throughout different portions (e.g., different horizontal and vertical portions) of a structure. Conversely, as used herein, the term "heterogeneous" means relative amounts of one or more material(s) vary throughout different portions of a structure. Amounts of the material(s) may vary stepwise (e.g., change abruptly), or may vary continuously (e.g., change progressively, such as linearly, parabolically) throughout different portions of the structure. In some embodiments, the semipermeable structure 106 is substantially homogeneous. In additional embodiments, the semipermeable structure 106 is heterogeneous. The semipermeable structure 106 may, for example, be formed of and include a stack of at least two (2) different materials.

The semipermeable structure 106 may exhibit a porosity that facilitates selective migration (e.g., selective transfer) of one or more material(s) of a feed fluid received by the first region 112 of the internal chamber 110 of the TR membrane apparatus 100 into the second region 114 of the internal chamber 110 of the TR membrane apparatus 100. Pores (e.g., apertures, openings, etc.) of the semipermeable structure 106 may extend in tortuous (e.g., twisting, winding, etc.) paths throughout a thickness of the semipermeable structure 106, and/or may extend in substantially linear paths throughout a thickness of the semipermeable structure 106. In some embodiments, the pores of the semipermeable structure 106 are sized to permit the one or more material(s) (e.g., one or more material(s) in a gaseous phase) within the first region 112 of the internal chamber 110 of the TR membrane apparatus 100 to traverse the semipermeable structure 106 while excluding other materials) within one or more of the first region 112 and the second region 114 of the internal chamber 110 of the TR membrane apparatus 100 from migrating therethrough. In additional embodiments, the semipermeable structure 106 is formed or selected to have properties promoting selective migration of one or more material(s) therethrough separation mechanisms not dependent on size exclusion, such as separation mechanisms based on physical and/or electrostatic interactions within the semipermeable structure 106.

With continued reference to FIG. 1, the TR structure 108 of the TR membrane 104 is configured to assist with managing heat within the TR membrane apparatus 100. The TR structure 108 of the TR membrane 104 may be configured to direct (e.g., reflect) at least some thermal energy (e.g., heat) directed to TR membrane 104 away from the TR membrane 104. For example, the TR structure 108 may be configured to reflect some heat received from a feed fluid within the first region 112 of the internal chamber 110 of the TR membrane apparatus 100 back into the feed fluid. The TR structure 108 may control heat loss through the TR membrane 104 to circumvent thermal equilibrium between opposing sides of the TR membrane 104. The TR structure 108 may permit some heat received from the feed fluid to be transferred through the TR membrane 104 and into the second region 114 of the internal chamber 110 of the TR membrane apparatus 100.

The TR structure 108 of the TR membrane 104 may be formed of and include at least one porous, thermally reflective material compatible with the semipermeable structure 106 of the TR membrane 104 and the materials of at least a feed fluid to be received into the first region 112 of the internal chamber 110 of the TR membrane apparatus 100, and permeable to one or more material(s) desired to be transferred from the feed fluid and into the second region 114 of the internal chamber 110 of the TR membrane apparatus 100. For example, referring to FIG. 2, which is a simplified cross-sectional view illustrating how a microstructure of a region of the TR structure 108 may appear under magnification, the TR structure 108 may be formed of and include discrete TR particles 122; and at least one binder material 128 (e.g., at least one adhesive material) coupling the discrete TR particles 122 to one another and the semipermeable structure 106 (FIG. 1). Interstitial spaces 130 (e.g., pores, openings) (shaded black in FIG. 2) are present between the discrete TR particles 122.

Figure 2:
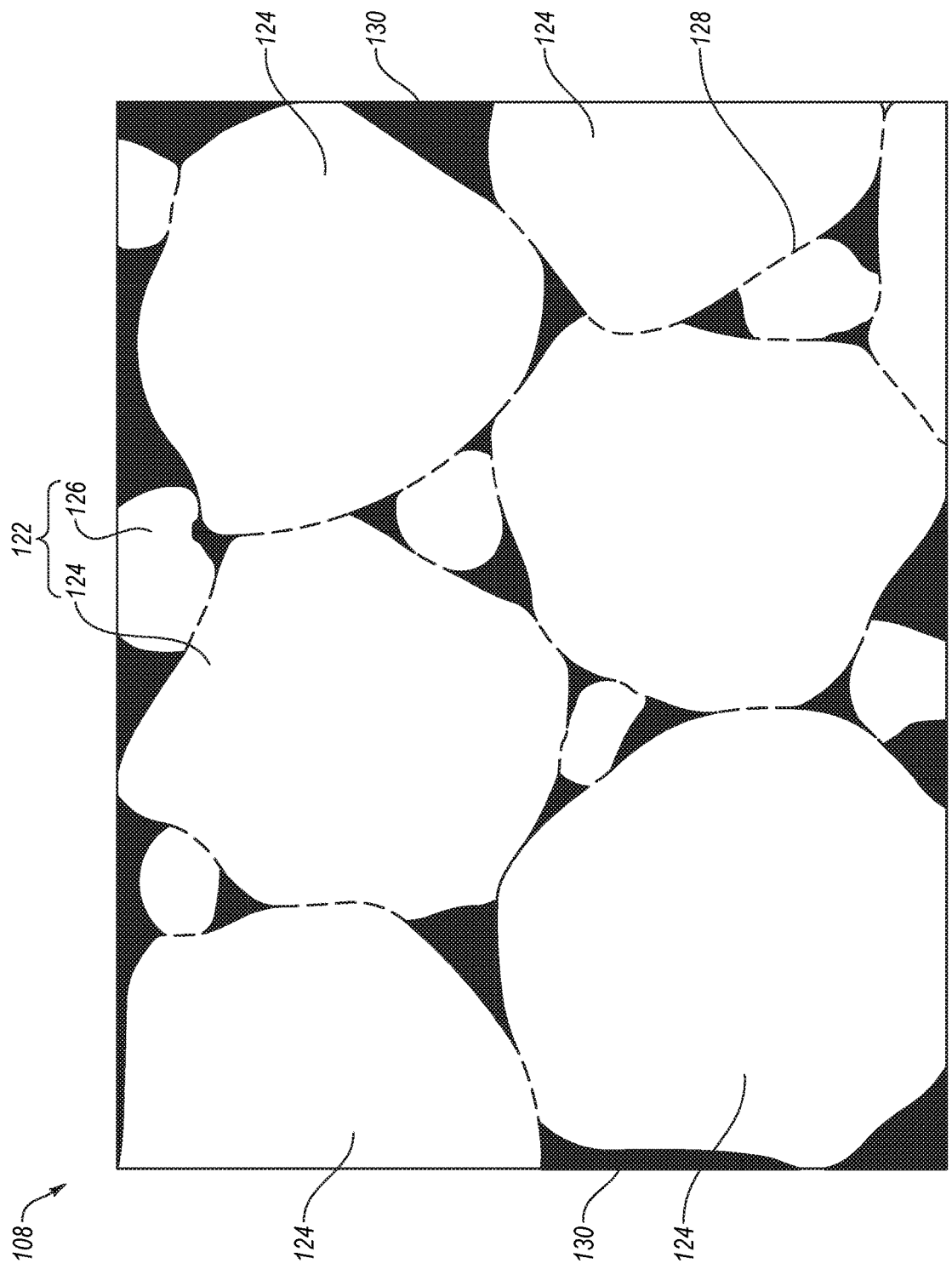
FIG. 2 is a simplified cross-sectional view illustrating how a microstructure of a region of a thermally reflective structure of the thermally reflective membrane apparatus shown in FIG. 1 may appear under magnification.

With continued reference to FIG. 2, the discrete TR particles 122 may be formed at least one TR material (e.g., at least one TR pigment) able to reflect wavelengths of electromagnetic radiation within the infrared (IR) region of the electromagnetic spectrum, such as wavelengths of electromagnetic radiation with a range of from about 700 nanometers (nm) to about 2500 nm. The TR material may at least reflect wavelengths of electromagnetic radiation within the heat-producing portion of the IR region, such as wavelengths of electromagnetic radiation within a range of from about 700 nm to about 1500 nm. By way of non-limiting example, the TR material may comprise one of more of a metal oxide (e.g., titanium dioxide ($TiO_2$)) and a mixed metal oxide. In some embodiments, the TR material of at least some of the discrete TR particles 122 comprises $TiO_2$.

Optionally, at least some (e.g., all, less than all) of the discrete TR particles 122 may functionalized to have desirable affinities or aversions to one or more material(s) of a feed fluid to be treated by the TR membrane apparatus 100 (FIG. 1). The discrete TR particles 122 may, for example, be functionalized to inhibit (substantially prevent) wetting by material(s) (e.g., solvent, solute(s)) of the feed fluid that may adversely affect the thermal reflectivity of the discrete TR particles 122. As a non-limiting example, if the feed fluid comprises an aqueous solution, at least some of the discrete TR particles 122 may be imparted with hydrophobic functional groups (e.g., fluoroorganosiloxane groups) and/or may be coated with a hydrophobic material (e.g., a hydrophobic polymer material). Desirable functional groups (if any) may be attached to the discrete TR particles 122 directly and/or through intermediate functional groups (e.g., carboxy groups, amino groups, etc.) by way of one or more conventional reaction mechanisms (e.g., amination, nucleophilic substitution, oxidation, Stille coupling, Suzuki coupling, Sharpless coupling (click-chemistry), disulfide coupling, diazo coupling, organometallic coupling, etc.). In additional embodiments, the material(s) of the discrete TR particles 122 is/are formulated to exhibit desired affinities and/or aversions for different material(s) of the feed fluid without having to perform additional functionalization acts.

The discrete TR particles 122 may each individually have a particle size within a range of from about 0.25 micrometer (μm) to about 25 μm, such as within a range of from about 0.25 μm to about 15 μm, from about 0.25 μm to about 5 μm, from about 0.35 μm to about 1 μm, from about 0.35 μm to about 0.75 μm, or from about 0.35 μm to about 0.55 μm. The particle sizes of the discrete TR particles 122 may influence the wavelengths of electromagnetic radiation reflected by the TR structure 108. In some embodiments, the discrete TR particles 122 have particle sizes promoting the reflection of electromagnetic radiation within the heat-producing portion of the IR region (e.g., electromagnetic radiation having a wavelength within a range of from about 700 nm to about 1500 nm), such as particle sizes within a range of from about 0.25 μm to about 25 μm. In addition, the discrete TR particles may each individually exhibit a desired shape, such as one or more of a spherical shape, a hexahedral shape, an ellipsoidal shape, a cylindrical shape, a conical shape, and an irregular shape.

The discrete TR particles 122 may be monodisperse, wherein each of the discrete particles exhibits substantially the same material composition, substantially the same particle size, and substantially the same shape as each other of the discrete TR particles; or may be polydisperse, wherein at least one of the discrete TR particles 122 exhibits one or more of a different material composition, a different particle size, and a different shape than at least one other of the discrete TR particles. In some embodiments, the discrete TR particles 122 have a multi-modal (e.g., bi-modal, tri-modal, etc.) particle size distribution. For example, as shown in FIG. 2, the discrete TR particles 122 may include a combination of relatively larger particles 124 and relatively smaller particles 126. In additional embodiments, the discrete TR particles 122 have a mono-modal particle size distribution. For example, all of the discrete TR particles 122 may exhibit substantially the same particle size.

The binder material 128 of the TR structure 108 may comprise at least one material formulated to keep the discrete TR particles 122 adhered (e.g., bound, coupled) to the semipermeable structure 106 (FIG. 1) and one another during use and operation of the TR membrane apparatus 100 (FIG. 1). The binder material 128 may secure (e.g., physically anchor) the discrete TR particles 122 to the semipermeable structure 106 and one another, while also maintaining desirable porosity characteristics in the semipermeable structure 106 and the TR structure 108 for selective migration of one or more material(s) of a feed fluid therethrough during use and operation of the TR membrane apparatus 100. Accordingly, the binder material 128 of the TR structure 108 may be selected at least partially based on the properties (e.g., material compositions) of the semipermeable structure 106, the feed fluid to be treated by the TR membrane apparatus 100, and the discrete TR particles 122 of the TR structure 108. In some embodiments, the binder material comprises one or more of at least one polymeric resin and at least one crosslinking material, such as one or more of an epoxy material, a dopamine material (e.g., a polydopamine (PD) material), a phenolic material, an olefin coupling material, a melamine material, a silicone material, a ceramic paste material, and a disulfide coupling material.

With continued reference to FIG. 2, one or more of the interstitial spaces 130 of the TR structure 108 may be at least partially filled with one or more solid materials) (e.g., the binder material 128), so long as the TR structure 108 as a whole exhibits sufficient porosity to facilitate selective migration (e.g., transfer) of one or more material(s) of a feed fluid received by the first region 112 of the internal chamber 110 of the TR membrane apparatus 100 into the second region 114 of the internal chamber 110 of the TR membrane apparatus 100. In additional embodiments, at least some (e.g., all, less than all) of the interstitial spaces 130 of the TR structure 108 may be substantially free of one or more solid material(s) therein.

With returned reference to FIG. 1, in some embodiments, the TR structure 108 of the TR membrane 104 is positioned between the semipermeable structure 106 of the TR membrane 104 and the first region 112 (e.g., feed fluid region) of the internal chamber 110 of the TR membrane apparatus 100. The TR structure 108 may, for example, be provided on one or more surface(s) (e.g., outer surface(s), external surface(s)) of the semipermeable structure 106 relatively more proximate the first region 112 of the internal chamber 110 of the TR membrane apparatus 100 and relatively more distal from the second region 114 of the internal chamber 110 of the TR membrane apparatus 100. The TR structure 108 may at least partially (e.g., substantially) cover (e.g., coat) surface(s) of the semipermeable structure 106 most proximate the first region 112 of the internal chamber 110 of the TR membrane apparatus 100.

Figure 3:
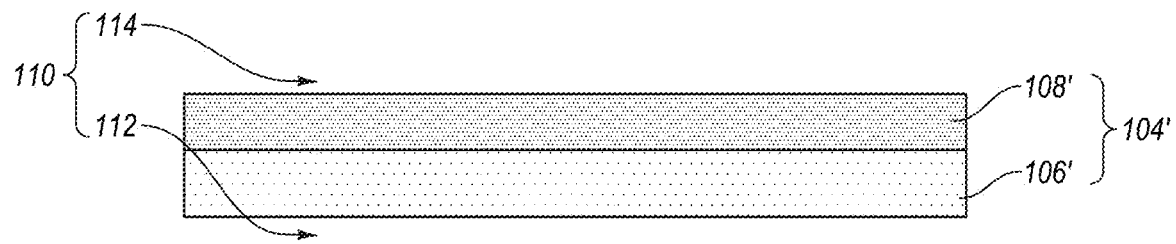
FIG. 3 is a simplified cross-sectional view of a thermally reflective membrane, in accordance with another embodiment of the disclosure.
Figure 4:
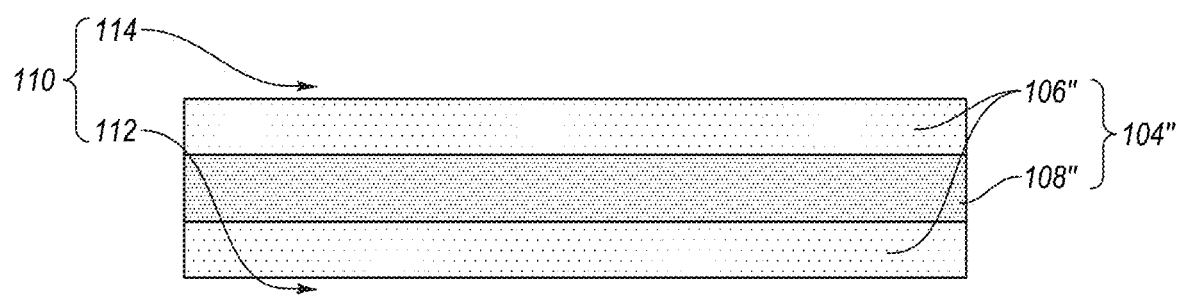
FIG. 4 is a simplified cross-sectional view of a thermally reflective membrane, in accordance with an additional embodiment of the disclosure.
Figure 5:
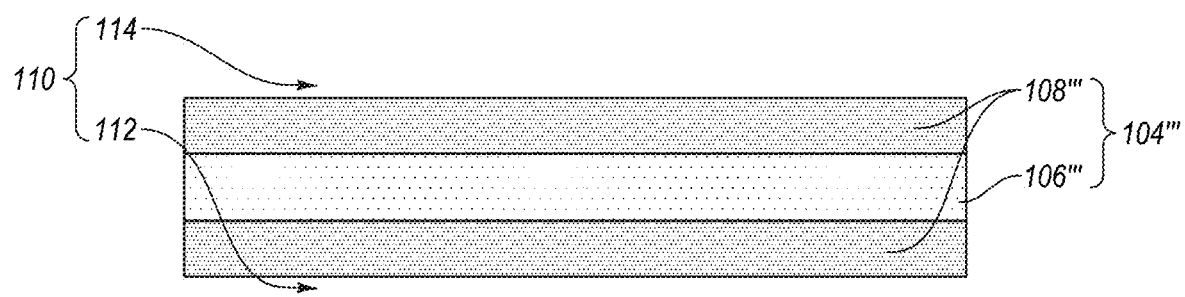
FIG. 5 is a simplified cross-sectional view of a thermally reflective membrane, in accordance with yet another embodiment of the disclosure.

In additional embodiments, the TR structure 108 is provided in a different location relative to the semipermeable structure 106. By way of not limiting example, FIGS. 3 through 5 are simplified cross-sectional views of additional TR membrane configurations that may be employed by the TR membrane apparatus 100, in accordance with additional embodiments of the disclosure. To avoid repetition, except as otherwise described below (e.g., with respect to relative positions of features), throughout FIGS. 3 through 5 (and the written description associated therewith) a feature designated by a reference numeral that is a prime ('), a double prime ("), or a triple prime ('") of the reference numeral of a previously-described feature (whether the previously-described feature is first described before the present paragraph, or is first described after the present paragraph) will be understood to be substantially similar to the previously-described feature.

Referring to FIG. 3, in additional embodiments, a TR membrane 104' is configured such that at least one TR structure 108' of the TR membrane 104' is positioned between at least one semipermeable structure 106' of the TR membrane 104' and the second region 114 (e.g., permeate region, produced fluid region) of the internal chamber 110 of the TR membrane apparatus 100 (FIG. 1). The TR structure 108' may, for example, be provided on one or more surface(s) (e.g., outer surface(s), external surface(s)) of the semipermeable structure 106' relatively more proximate the second region 114 of the internal chamber 110 of the TR membrane apparatus 100 (FIG. 1) and relatively more distal from the first region 112 of the internal chamber 110 of the TR membrane apparatus 100 (FIG. 1). The TR structure 108' may at least partially (e.g., substantially) cover (e.g., coat) surface(s) of the semipermeable structure 106' most proximate the second region 114 of the internal chamber 110 of the TR membrane apparatus 100 (FIG. 1).

Referring to next FIG. 4, in further embodiments, a TR membrane 104" is configured such that at least one TR structure 108" of the TR membrane 104" is positioned within (e.g., embedded with) at least one semipermeable structure 106" of the TR membrane 104". The TR structure 108' may, for example, be provided between two or more portions of a single (e.g., only one) semipermeable structure 106" and/or between at least two different semipermeable structures 106", such that the semipermeable structure(s) 106" is/are interposed between the TR structure 108' and each of the first region 112 and the second region 114 of the internal chamber 110 of the TR membrane apparatus 100 (FIG. 1). The semipermeable structure(s) 106'' may at least partially (e.g., substantially) cover surfaces of the TR structure 108'' most proximate the first region 112 and the second region 114 of the internal chamber 110 of the TR membrane apparatus 100 (FIG. 1).

Referring to next FIG. 5, in further embodiments, a TR membrane 104''' is configured such that at least one semipermeable structure 106''' of the TR membrane 104''' is positioned within (e.g., embedded within) at least one TR structure 108''' of the TR membrane 104'''. The semipermeable structure 106''' may, for example, be provided between two or more portions of a single (e.g., only one) TR structure 108''' and/or between at least two different TR structures 108''', such that the TR structure(s) 108''' is/are interposed between the semipermeable structure 106''' and each of the first region 112 and the second region 114 of the internal chamber 110 of the TR membrane apparatus 100 (FIG. 1). The TR structure(s) 108''' may at least partially (e.g., substantially) cover surfaces of the semipermeable structure 106''' most proximate the first region 112 and the second region 114 of the internal chamber 110 of the TR membrane apparatus 100 (FIG. 1).

With returned reference to FIG. 1, although the TR membrane apparatus 100 is depicted in FIG. 1 as including a single (i.e., only one) TR membrane 104, the TR membrane apparatus 100 may include any quantity (e.g., number) of TR membranes 104 (and/or TR membranes 104', 104'', 104''' previously described with reference to FIGS. 3 through 5). Put another way, the TR membrane apparatus 100 may include a single (e.g., only one) TR membrane 104 (or TR membrane 104', 104'', or 104''' previously described with reference to FIGS. 3 through 5), or may include multiple (e.g., more than one) TR membranes 104 (and/or TR membranes 104', 104'', 104'''. If the TR membrane apparatus 100 includes multiple TR membranes 104 (and/or TR membranes 104', 104'', 104'''), each of the TR membranes 104 (and/or TR membranes 104', 104'', 104''') may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates), or at least one of the TR membranes 104 (and/or TR membranes 104', 104'', 104''') may be different (e.g., exhibit one or more of different components, different component sizes, different component shapes, different component material compositions, different component material distributions, different component positions, different component orientations) than at least one other of the TR membranes 104 (and/or TR membranes 104', 104'', 104''') and/or may be operated under different conditions (e.g., different temperatures, different pressures, different flow rates, etc.) than at least one other of the TR membranes 104 (and/or TR membranes 104', 104'', 104'''). In some embodiments, two or more TR membranes 104 (and/or TR membranes 104', 104'', 104''') are provided in parallel with one another within the housing structure 102 of the TR membrane apparatus 100. In additional embodiments, two or more TR membranes 104 (and/or TR membranes 104', 104'', 104''') are provided in series with one another within the housing structure 102 of the TR membrane apparatus 100.

With continued reference to FIG. 1, if present, the thermal isolation structure 118 of the TR membrane apparatus 100 may be located within the first region 112 of the internal chamber 110 of the TR membrane apparatus 100. At least a portion of the first region 112 of the internal chamber 110 of the TR membrane apparatus 100 may intervene between the thermal isolation structure 118 and the TR membrane 104. The thermal isolation structure 118 comprise at least one structure (e.g., plate, foil, mesh) configured to reflect thermal energy of a feed fluid received by the first region 112 of the internal chamber 110 of the TR membrane apparatus 100. The thermal isolation structure 118 may, for example, reflect thermal energy back into the feed fluid and toward the TR structure 108. The thermal isolation structure 118 may be formed of and include at least one material (e.g., at least one relatively low thermal conductivity material) that remains in a solid state at a temperature of the feed fluid within the first region 112 of the internal chamber 110 of the TR membrane apparatus 100, such as one or more of metal material (e.g., aluminum), a polymeric material, a ceramic material, and a composite material. In additional embodiments, such as embodiments wherein the housing structure 102 of the TR membrane apparatus 100 comprises a thermally reflective material, the thermal isolation structure 118 may be omitted (e.g., absent) from the first region 112 of the internal chamber 110 of the TR membrane apparatus 100.

Still referring to FIG. 1, if present, the internal cooling device 120 of the TR membrane apparatus 100 may be located within the second region 114 of the internal chamber 110 of the TR membrane apparatus 100. At least a portion of the second region 114 of the internal chamber 110 of the TR membrane apparatus 100 may intervene between the internal cooling device 120 and the TR membrane 104. The internal cooling device 120 may comprise at least one device (e.g., a condenser device) configured and operated to cool material(s) received by the second region 114 of the internal chamber 110 of the TR membrane apparatus 100. For example, internal cooling device 120 may be configured at operated to condense gaseous material(s) (e.g., water vapor) selectively transferred into the second region 114 of the internal chamber 110 of the TR membrane apparatus 100 from a feed fluid within the first region 112 of the internal chamber 110 of the TR membrane apparatus 100 by way of the TR membrane 104. In some embodiments, the internal cooling device 120 comprises at least one coolant line configured and operated to decrease the temperature of one or more material(s) (e.g., one or more gaseous material(s)) received by the second region 114 of the internal chamber 110 of the TR membrane apparatus 100 using at least one exchange fluid (e.g., air, water, a conventional refrigerant, etc.). If present within the TR membrane apparatus 100, the internal cooling device 120 may be configured and operated to have an operating temperature of less than or equal to about 50° C., such as within a range of from about 50° C. to about −22° C.

In additional embodiments, the internal cooling device 120 is absent (e.g., omitted) from the TR membrane apparatus 100. As described in further detail below, in lieu of (or in combination with) the internal cooling device 120, an external cooling device may be positioned downstream of the TR membrane apparatus 100 so as to receive and cool one or more material(s) (e.g., gaseous material(s), such as gaseous material(s) selectively transferred into the second region 114 of the internal chamber 110 of the TR membrane apparatus 100 from a feed fluid within the first region 112 of the internal chamber 110 of the TR membrane apparatus 100 by way of the TR membrane 104) exiting the second region 114 of the internal chamber 110 of the TR membrane apparatus 100. The cooling device may, for example, be configured at operated to condense gaseous material(s) (e.g., water vapor) exiting the second region 114 of the internal chamber 110 of the TR membrane apparatus 100. As another example, in lieu of (or in combination with) the internal cooling device 120, an external cooling device may be positioned upstream of the TR membrane apparatus 100 so as to cool one or more fluid(s) directed into the second region 114 of the internal chamber 110 of the TR membrane apparatus 100, that may, in turn, cool other material(s) received by the second region 114 of the internal chamber 110 (e.g., gaseous material(s), such as gaseous material(s) selectively transferred into the second region 114 of the internal chamber 110 from a feed fluid within the first region 112 of the internal chamber 110 by way of the TR membrane 104).

Figure 6:
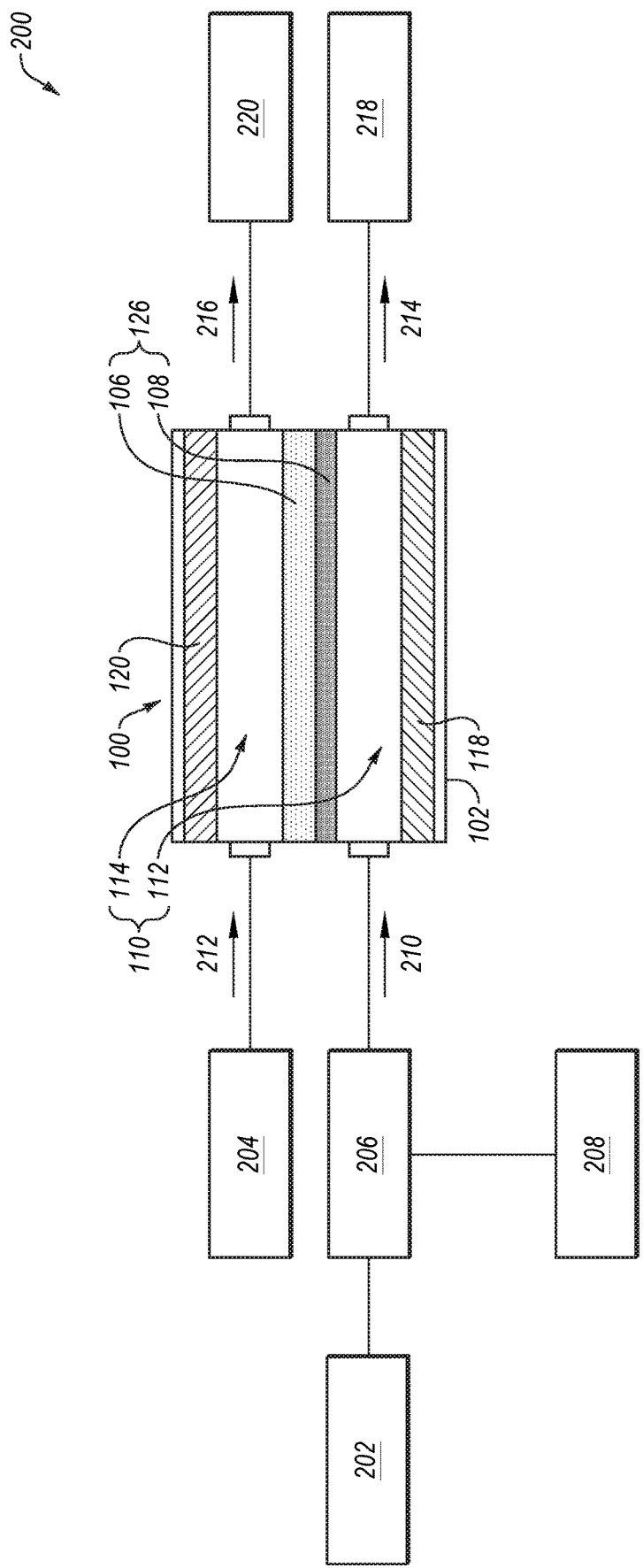
FIG. 6 is a simplified schematic view of a fluid treatment system, in accordance with an embodiment of the disclosure.

TR membrane apparatuses (e.g., the TR membrane apparatus 100) in accordance with embodiments of the disclosure may be used in embodiments of fluid treatment systems of the disclosure. For example, FIG. 6 is a simplified schematic view of a fluid treatment system 200, in accordance with embodiments of disclosure. The fluid treatment system 200 may be used to separate one or more material(s) of a feed fluid from one or more other material(s) of the feed fluid. As described in further detail below, the fluid treatment system 200 may include an embodiment of the TR membrane apparatus 100 previously described herein. In some embodiments, the TR membrane apparatus 100 is employed and operated within the fluid treatment system 200 to effectuate membrane distillation (MD) (e.g., direct contact MD (DCMD), liquid gap MD (LGMD), air gap MD (AGMD), a vacuum MD (VMD), sweeping gas MD (SWGMD), vacuum multi-effect MD (V-MEMD), permeate gap MD (PGMD)) of the feed fluid.

As shown in FIG. 6, the fluid treatment system 200 may include at least one feed fluid source 202, and at least one TR membrane apparatus 100 in fluid communication with (e.g., downstream of) the feed fluid source 202. The TR membrane apparatus 100 may be configured and operated to receive at least one feed fluid stream 210 from the feed fluid source 202 within the first region 112 of the internal chamber 110 thereof and to selectively transfer one or more material(s) of the feed fluid stream 210 through TR membrane 104 and into the second region 114 of the internal chamber 110 using MD to form a produced fluid stream 216 and a feed fluid remnants stream 214. The produced fluid stream 216 may include separated material(s) of the feed fluid stream 210. The feed fluid remnants stream 214 includes remaining material(s) (e.g., material(s) not transferred to the second region 114 of the internal chamber 110) of the feed fluid stream 210. Optionally, the fluid treatment system 200 may further include at least one additional fluid source 204 upstream of the at least one heat transfer apparatus 206. If present, the additional fluid source 204 may direct at least one additional fluid stream 212 into the second region 114 of the internal chamber 110 thereof. In such embodiments, the produced fluid stream 216 includes separated material(s) of the feed fluid stream 210 as well as material(s) of the additional fluid stream 212. As described in further detail below, the presence (or absence) of the additional fluid source 204, as well as the properties (e.g., material composition, temperature, etc.) of the additional fluid stream 212 (if any) may at least partially depend on the type of separation process (e.g., the type of MD, such as DCMD, LGMD, AGMD, VMD, SWGMD, V-MEMD, PGMD) the TR membrane apparatus 100 is being employed to perform. In addition, as also described in further detail below, the fluid treatment system 200 may further include one or more additional components (e.g., one or more additional apparatus(es)), such as one or more of at least one heat transfer apparatus 206 operatively associated with one or more of the feed fluid source 202, the TR membrane apparatus 100 (e.g., housing structure 102 thereof; the first region 112 of the internal chamber 110 thereof), and the feed fluid stream 210; at least one additional apparatus 220 (e.g., a cooling apparatus, a vacuum apparatus) downstream of the second region 114 of the internal chamber 110 of the TR membrane apparatus 100; and at least one energy source 208 operatively associated with one or more of the TR membrane apparatus 100, the heat transfer apparatus 206, and the additional apparatus 220.

With continued reference to FIG. 6, the feed fluid source 202 comprises at least one apparatus configured and operated to store and/or produce one or more fluids (e.g., a liquid fluid, such as an aqueous liquid; a gaseous fluid). As a non-limiting example, the feed fluid source 202 may comprise a storage vessel (e.g., a tank) configured and operated to contain one or more of a liquid fluid and a gaseous fluid.

The feed fluid stream 210 may comprise one or more of an aqueous liquid; an organic liquid; a non-aqueous, inorganic liquid; an aqueous gas; an organic gas; a non-aqueous, inorganic gas; and a supercritical fluid. In some embodiments, the feed fluid stream 210 exhibits a single (e.g., only one) phase state (e.g., only one liquid phase, or only one gaseous phase). In additional embodiments, the feed fluid stream 210 exhibits multiple (e.g., more than one) phase states (e.g., multiple liquid phases, multiple gas phases, at least one liquid phase and at least one gaseous phase).

In some embodiments, the feed fluid stream 210 comprises an aqueous liquid, such as an aqueous solution. As used herein, the term "solution" means and includes a solution, a suspension, an emulsion, or a combination thereof. Since a person of ordinary skill in the art will recognize whether a particular reference describes a solution, a suspension, an emulsion, or a combination thereof from the context, for the purposes of readability and claiming the invention, the term "solution" means a solution, a suspension, an emulsion, or a combination thereof. The aqueous solution may include liquid $H_2O$ solvent and at least one solute. The solute may comprise one or more of at least one homogenous material and at least one heterogeneous material. Non-limiting examples of homogenous materials include inorganic materials (e.g., water soluble minerals; water soluble compounds, such as salts; radionuclides; scalants, such as calcium carbonate, calcium sulfate, barium sulfate, strontium sulfate, calcium fluoride, iron, colloidal materials, sodium metasilicate, sodium orthosilicate, sodium pyrosilicate, other sodium silicates, other water-soluble silicates), organic materials (e.g., hydrocarbon solids, hydrocarbon liquids, pharmaceuticals, plasticizers, phase modifiers, industrial chemicals, organics found in produced water, room temperature ionic liquids (RTILs)), and inorganic/organic hybrid materials (e.g., coordination complexes (heme) and organometallic complexes, such as ferrocene). Non-limiting examples of heterogeneous materials include algae, microbes, small particulate matter, undissolved sewage material, nanoparticles, polymers, industrial muds or pumping fluids, and food product solution materials, such as fruit juices and milk solutions. The solute may be present as a contaminant or impurity of the liquid $H_2O$, or the liquid $H_2O$ may be present as a contaminant or impurity of the solute. By way of non-limiting example, the feed fluid stream 210 may comprise one or more of an aqueous saline solution, seawater, brine, brackish water, mineralized water, industrial waste water, produced water, mining waste (e.g., an aqueous potash solution, an aqueous gypsum solution, an aqueous lithium salt solution), a food product solution (e.g., an aqueous fruit juice solution, an aqueous milk solution), an aqueous acid solution, an aqueous base solution, an aqueous synthetic or natural fermentation broth, an aqueous algal growth media, an aqueous microbial solution, an aqueous landfill leachate, an aqueous radioactive material solution, and an aqueous toxic material solution. In some embodiments, a total dissolved solids (TDS) content of the feed fluid stream 210 is greater than or equal to about 10 parts per million (ppm) (e.g., within a range of from about 10 ppm to about 35,000 ppm; 150 ppm to about 1,500 ppm; 35,000 ppm to 75,000 ppm; greater than or equal to about 40,000 ppm).

In additional embodiments, the feed fluid stream 210 comprises one or more of an organic liquid (e.g., an organic solution including an organic liquid solvent, such as a hydrocarbon liquid; and at least one solute, such as one or more of additional organic liquid(s), $H_2O$ liquid, inorganic liquid(s), and solid material(s)); an inorganic liquid (e.g., an inorganic liquid solution including a non-aqueous, inorganic liquid solvent, such as liquid ammonia, liquid sulfur dioxide, liquid sulfuryl chloride, liquid sulfuryl chloride fluoride, liquid phosphoryl chloride, liquid dinitrogen tetroxide, liquid antimony trichloride, liquid bromine pentafluoride, liquid hydrogen fluoride, or liquid inorganic acid; and at least one solute, such as one or more of additional non-aqueous, inorganic liquid, $H_2O$ liquid, organic liquid(s), and solid material(s)); a gaseous material (e.g., a gaseous mixture including two or more of $H_2O$ gas; at least one organic gas; at least one inorganic, non-aqueous gas; and at least one non-gaseous material, such as suspended solid particles and/or suspended liquid droplets); and a supercritical fluid (e.g., supercritical carbon dioxide (SC $CO_2$).

A single (e.g., only one) feed fluid stream 210 may exit the feed fluid source 202, or multiple (e.g., more than one) feed fluid streams 210 may exit the feed fluid source 202. If multiple feed fluid streams 210 exit the feed fluid source 202, each of the feed fluid streams 210 may exhibit substantially the same properties (e.g., substantially the same material composition, substantially the same temperature, substantially the same pressure, substantially the same flow rate, etc.), or at least one of the multiple feed fluid streams 210 may exhibit one or more different properties (e.g., a different material composition, a different temperature; a different pressure; a different flow rate) than at least one other of the multiple feed fluid streams 210.

With continued reference to FIG. 6, if present, the additional fluid source 204 may comprise at least one apparatus configured and operated to store and/or produce one or more fluids (e.g., liquid fluid, such aqueous liquid; gaseous fluid). As a non-limiting example, the additional fluid source 204 may comprise a containment vessel (e.g., a tank, a storage vessel) configured and operated to contain one or more of a liquid fluid and a gaseous fluid.

The additional fluid stream 212, if any, may comprise one or more of an aqueous liquid; an organic liquid; a non-aqueous, inorganic liquid; an aqueous gas; an organic gas; a non-aqueous, inorganic gas; and a supercritical fluid. A material composition of the additional fluid stream 212 may be selected to facilitate the separation of one or more material(s) of the feed fluid stream 210 from one or more other materials of the feed fluid stream 210 through a desired separation process (e.g., an MD process, such as DCMD, LGMD, AGMD, VMD, SWGMD, V-MEMD, or PGMD) using the TR membrane apparatus 100. The material composition of the additional fluid stream 212 may be substantially the same as a material composition of the material(s) (e.g., water) desired to be separated (e.g., selectively removed) from the feed fluid stream 210, or may be different than the material composition of the material(s) desired to be separated from the feed fluid stream 210. If the material composition of the additional fluid stream 212 is different than that of the specific material(s) desired to be selectively separated from the feed fluid stream 210, the additional fluid stream 212 may be formulated such that the material(s) thereof may be easily separated from the material(s) of the feed fluid stream 210 selectively transferred into the additional fluid stream 212 using conventional processes (e.g., conventional material separation processes) and conventional processing equipment. In some embodiments, the additional fluid stream 212 exhibits a single (e.g., only one) phase state (e.g., only one liquid phase, or only one gaseous phase). In additional embodiments, the additional fluid stream 212 exhibits multiple (e.g., more than one) phase states (e.g., multiple liquid phases, multiple gas phases, at least one liquid phase and at least one gaseous phase).

In some embodiments, such as embodiments wherein the TR membrane apparatus 100 is employed for DCMD, LGMD, or PGMD, the additional fluid stream 212 comprises a liquid material (e.g., liquid $H_2O$, an aqueous solution including liquid $H_2O$ solvent and at least one solute). As a non-limiting example, the additional fluid stream 212 may comprise substantially pure liquid $H_2O$, or a solution including liquid $H_2O$ solvent and at least one solute. In additional embodiments, such as embodiments wherein the TR membrane apparatus 100 is employed for SWGMD, the additional fluid stream 212 comprises a gaseous material, such as a sweeping gas. In further embodiments, such as embodiments wherein the TR membrane apparatus 100 is employed for AGMD, VMD, or V-MEMD, an additional fluid stream 212 is not directed into the second region 114 of the internal chamber 110 of the TR membrane apparatus 100.

Within the TR membrane apparatus 100 a difference in chemical potential, facilitated by temperature differences, between opposing sides of the TR membrane 104 (e.g., a first side adjacent the first region 112 of the internal chamber 110 of the TR membrane apparatus 100; and a second, opposing side adjacent the second region 114 of the internal chamber 110 of the TR membrane apparatus 100) may drive selective migration (e.g., transfer) of one or more material(s) (e.g., $H_2O$) of the feed fluid stream 210 into the second region 114 of the internal chamber 110 of the TR membrane apparatus 100 to form the produced fluid stream 216. Mass transport of the material(s) of the feed fluid stream 210 may be initiated by evaporation of the material(s) at a boundary between a gaseous (e.g., vapor) phase and a liquid phase at pores of the TR membrane 104. A gaseous phase of the material(s) may be driven through the TR membrane 104 and into the second region 114 of the internal chamber 110 of the TR membrane apparatus 100 by partial pressure resulting from a partial vapor pressure difference effectuated by the temperature differences between the opposing sides of the TR membrane 104. The gaseous phase of the material(s) (e.g., $H_2O$ vapor) may be transported through the TR membrane 104, while a liquid phase of the material(s) (e.g., $H_2O$ liquid) and additional liquids and/or solids within the feed fluid stream 210 may not be transported through the TR membrane 104. During the process, the TR structure 108 of the TR membrane 104 may inhibit heat transfer (e.g., heat loss) from the feed fluid stream 210 within the first region 112 of the internal chamber 110 into the second region 114 of the internal chamber 110 to circumvent thermal equilibrium between the opposing sides of the TR membrane 104. The TR structure 108 of the TR membrane 104 may effectuate a reduction in the amount of cooling needed to subsequently condense the gaseous phase state of the transferred material(s) into a liquid phase state relative to conventional membrane configurations. In addition, thermal energy redirected (e.g., reflected) into the first region 112 of the internal chamber 110 by the TR structure 108 of the TR membrane 104 may be recovered (e.g., from the feed fluid remnants stream 214). Accordingly, the TR membrane apparatus 100 (including the TR membrane 104 thereof) of the disclosure may enhance the thermal efficiency of MD as compared to conventional separation apparatus configurations.

A temperature of the feed fluid stream 210 within the first region 112 of the internal chamber 110 of the TR membrane apparatus 100 may be controlled to be greater (e.g., warmer, hotter) than a temperature (e.g., a temperature of the additional fluid stream 212) within the second region 114 of the internal chamber 110 of the TR membrane apparatus 100 to drive one or more material(s) (e.g., H$_2$O) of the feed fluid stream 210 from the feed fluid stream 210 and into the second region 114 of the internal chamber 110 by way of MD. A temperature of the feed fluid stream 210 within the first region 112 of the internal chamber 110 may, for example, be controlled to be greater than or equal to about one (1) degree Celsius (° C.) warmer than a temperature within second chamber 114 of the internal chamber 110, such as within a range of from about 1° C. to about 50° C. greater than the temperature within second chamber 114 of the internal chamber 110. The feed fluid stream 210 (and the additional fluid stream 212, if any) may exhibit a substantially constant (e.g., substantially invariable, substantially unchanging) temperature over the period of time that the feed fluid stream 210 is directed into the TR membrane apparatus 100, or the feed fluid stream 210 (and/or the additional fluid stream 212) may exhibit variable (e.g., non-constant, changing) temperatures over the period of time the feed fluid stream 210 is directed into the TR membrane apparatus 100.

The feed fluid stream 210 (and the additional fluid stream 212, if any) may exhibit any pressure(s) permitting the selective transfer of one or more material(s) of the feed fluid stream 210 into the second region 114 of the internal chamber 110. The feed fluid stream 210 (and the additional fluid stream 212, if any) may each individually exhibit a substantially constant (e.g., substantially invariable, substantially unchanging) pressure over the period of time the feed fluid stream 210 is directed into the TR membrane apparatus 100, or the feed fluid stream 210 (and/or the additional fluid stream 212, if any) may exhibit variable (e.g., non-constant, changing) pressures over the period of time the feed fluid stream 210 is directed into the TR membrane apparatus 100.

The flow rate(s) of the feed fluid stream 210 (and the additional fluid stream 212, if any) may selected to control residence time within the TR membrane apparatus 100 as well as amount(s) (e.g., concentration(s)) of material(s) drawn from the feed fluid stream 210 within the produced fluid stream 216. The feed fluid stream 210 (and the additional fluid stream 212, if any) may exhibit a substantially constant (e.g., substantially invariable, substantially unchanging) flow rate over the period of time the feed fluid stream 210 is directed into the TR membrane apparatus 100, or the feed fluid stream 210 (and/or the additional fluid stream 212, if any) may exhibit variable (e.g., non-constant, changing) flow rates over the period of time the feed fluid stream 210 is directed into the TR membrane apparatus 100.

With continued reference to FIG. 6, although the fluid treatment system 200 is depicted in FIG. 1 as including a single (i.e., only one) TR membrane apparatus 100, the fluid treatment system 200 may include any quantity of TR membrane apparatuses 100. Put another way, the fluid treatment system 200 may include a single (e.g., only one) TR membrane apparatus 100, or may include multiple (e.g., more than one) TR membrane apparatuses 100. If the fluid treatment system 200 includes multiple TR membrane apparatuses 100, each of the TR membrane apparatuses 100 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the TR membrane apparatuses 100 may be different (e.g., exhibit one or more of different components, different component sizes, different component shapes, different component material compositions, different component material distributions, different component positions, different component orientations, etc.) than at least one other of the TR membrane apparatuses 100 and/or may be operated under different conditions (e.g., different temperatures, different pressures, different flow rates) than at least one other of the TR membrane apparatuses 100. By way of non-limiting example, one of the TR membrane apparatuses 100 may be configured for and operated under different temperature (e.g., different influent stream temperature) parameters than at least one other of the TR membrane apparatuses 100. In some embodiments, two of more TR membrane apparatuses 100 are provided in parallel with one another. Each of the two of more TR membrane apparatuses 100 may individually receive at least a feed fluid stream 210 (and, optionally an additional fluid stream 212) and may individually form a produced fluid stream 216. In additional embodiments, two of more TR membrane apparatuses 100 are provided in series with one another. One of the two or more TR membrane apparatuses 100 may receive a feed fluid stream 210 and an additional fluid stream 212 and may form an initial produced fluid stream 216 therefrom, and another of the two or more TR membrane apparatuses 100 may receive the initial produced fluid stream 216 (e.g., as a substitute for the feed fluid stream 210) and another additional fluid stream 212 and may form another produced fluid stream 216 therefrom.

Still referring to FIG. 6, the heat transfer apparatus 206 (if any) of the fluid treatment system 200 may comprise at least one apparatus (e.g., one or more of a heat exchanger, such as a tube-in-tube heat exchanger and/or a shell-and-tube heat exchanger; a combustion heater; a nuclear heater; a sonication heater; an electrical resistance heater; an inductive heater; an electromagnetic heater, such as an infrared heater and/or a microwave heater) configured and operated to influence the temperature (e.g., heat) one or more of at least a portion of the feed fluid source 202, the feed fluid stream 210, and one or more portions of the TR membrane apparatus 100. In some embodiments, the heat transfer apparatus 206 is employed to increase the temperature of the feed fluid stream 210 to facilitate separate of one or more materials thereof from one or more other materials thereof through membrane distillation effectuated using the TR membrane apparatus 100. The heat transfer apparatus 206 may, for example, heat the feed fluid stream 210 to a temperature sufficient to facilitate a phase change (e.g., a change from a liquid phase to a vapor phase) of one or more materials of the feed fluid stream 210 at the TR membrane 104 to facilitate the transfer of a gaseous (e.g,, vapor) phase of the material(s) through the TR membrane 104 and into the second region 114 of the internal chamber 110 of the TR membrane apparatus 100 by way of MD. The heat transfer apparatus 206 may, for example, be operatively coupled to (e.g., thermally coupled to) one or more of the feed fluid source 202 and one or more lines (e.g., pipes, tubes) fluidly connecting the feed fluid source 202 and the TR membrane apparatus 100. In additional embodiments, the heat transfer apparatus 206 heats the feed fluid stream 210 after the additional fluid stream 212 is directed into the TR membrane apparatus 100. The heat transfer apparatus 206 may, for example, be operatively coupled to (e.g., thermally coupled to) one or more portions of the TR membrane apparatus 100 receiving and interacting with the feed fluid stream 210.

Energy (e.g., thermal energy, electricity) used to operate one or more of the heat transfer apparatus 206 (if any), one or more portions the TR membrane apparatus 100 (e.g., the cooling device 120, if any), and other components (e.g., pumps, compressors, other heat transfer devices, cooling devices, detectors, sensors, regulators, other devices, other structures, other apparatuses) of the fluid treatment system 200 may be supplied by the energy source 208. The energy source 208 may, for example, comprise one or more of a device, structure, or apparatus configured and operated to exploit one or more of solar thermal energy (e.g., a solar pond; a concentrated solar power apparatus, such as one or more of parabolic tough, a solar power tower, an enclosed tough, a Fresnel reflector, a dish Stirling, etc.), wind (e.g., wind turbine) energy, hydropower energy, geothermal energy, nuclear energy, fuel cell energy, combustion-based energy (e.g., energy obtained through the combustion of one or more of hydrogen and at least one hydrocarbon material, such as one or more of coal, natural gas, freedom gas, oil, and biomass), and waste heat (e.g., heat generated from one or more of an engine, a chemical process, and a phase change process).

With continued reference to FIG. 6, the feed fluid remnants stream 214 formed from and depleted in material(s) (e.g., $H_2O$) relative to the feed fluid stream 210 may exit the TR membrane apparatus 100 (e.g., the first region 112 of the internal chamber 110 of the TR membrane apparatus 100), and may be utilized or disposed of as desired. As shown in FIG. 6, in some embodiments, at least a portion (e.g., all, less than all) of the feed fluid remnants stream 214 is directed into at least one additional unit of equipment 218 (e.g., device, vessel, apparatus, structure). The additional unit of equipment 218 may, for example, be configured and operated to facilitate to store and/or further process the feed fluid remnants stream 214. In some embodiments, the additional unit of equipment 218 comprises at least one containment vessel configured and operated to at least temporarily hold material(s) of the feed fluid remnants stream 214. In additional embodiments, at least a portion of the feed fluid remnants stream 214 is directed (e.g., recycled) into one or more of the feed fluid source 202 and the feed fluid stream 210.

Still referring to FIG. 6, the produced fluid stream 216 exiting the TR membrane apparatus 100 may be utilized or disposed of as desired. In some embodiments, the produced fluid stream 216 is directed into at least one additional apparatus 220. The configuration(s) and function(s) of the at least one additional apparatus 220 may at least partially depend on the separation process (e.g., the type of MD, such as DCMD, LGMD, AGMD, VMD, SWGMD, V-MEMD, PGMD) effectuated by the TR membrane apparatus 100 of the fluid treatment system 200. As a non-limiting example, if the TR membrane apparatus 100 is configured and operated to effectuate VMD or V-MEMD, the additional apparatus 220 may comprise as least one vacuum apparatus configured and operated to pull (e.g., suck, vacuum) gaseous material(s) (e.g., gaseous $H_2O$) out of the second region 114 of the internal chamber 110 of the TR membrane apparatus 100 as the produced fluid stream 216, and at least one cooling apparatus (e.g., at least one condenser) configured and operated to condense the pulled gaseous material(s) (e.g., pulled gaseous $H_2O$) of the produced fluid stream 216 into liquid material(s) (e.g., liquid $H_2O$). As another non-limiting example, if the TR membrane apparatus 100 is configured and operated to effectuate SWGMD, the additional apparatus 220 may comprise at least one cooling apparatus (e.g., at least one condenser) configured and operated to condense gaseous material(s) (e.g., gaseous $H_2O$) swept out (e.g., by way of sweeping gas of the additional fluid stream 212) of the second region 114 of the internal chamber 110 of the TR membrane apparatus 100 within the produced fluid stream 216 into liquid material(s) (liquid $H_2O$). As an additional non-limiting example, if the TR membrane apparatus 100 is configured and operated to effectuate DCMD, the additional apparatus 220 may comprise at least one heat exchanger configured and operated to recover heat from the produced fluid stream 216 exiting the second region 114 of the internal chamber 110 of the TR membrane apparatus 100. As a further non-limiting example, the additional apparatus 220 may comprise at least one containment vessel configured and operated to at least temporarily hold material(s) of the produced fluid stream 216. In additional embodiments, at least a portion of the produced fluid stream 216 is directed (e.g., recycled) into one or more of the additional fluid source 204 and the additional fluid stream 212.

With continued reference to FIG. 6, thermal energy may recovered (e.g., extracted) from one or more of the streams produced within the fluid treatment system 200. As a non-limiting example, heat may be transferred from one or more portions of feed fluid remnants stream 214 exiting the TR membrane apparatus 100 to one or more other stream(s) of fluid treatment system 200, such as additional portions of the feed fluid stream 210. The portion(s) of the feed fluid remnants stream 214 and the additional portions of the feed fluid stream 210 may, for example, be directed into at least one heat exchanger (e.g., the heat transfer apparatus 206, another heater transfer apparatus) to heat the additional portions of the feed fluid stream 210 and cool the portion(s) of the feed fluid remnants stream 214. The cooled portion(s) of the feed fluid remnants stream 214 may then be further utilized, processed, or disposed of, as desired. As another not limiting example, heat from one or more effluent coolant stream(s) exiting one or more apparatus(es) (if any) (e.g., the cooling device 120, the additional apparatus 220) employed to reduce a temperature (e.g., cool) of the produced fluid stream 216 may be transferred to one or more other stream(s) of the fluid treatment system 200, such as additional portions of the feed fluid stream 210. One or more portion(s) of the effluent coolant stream(s) and the additional portions of the feed fluid stream 210 may, for example, be directed into at least one heat exchanger (e.g., the heat transfer apparatus 206, another heat transfer apparatus) to heat the additional portions of the feed fluid stream 210 and cool the portion(s) of the effluent coolant stream(s). The cooled effluent coolant stream(s) may then then be further utilized (e.g., recycled into the apparatus(es) to cool additional portions of the produced fluid stream 216), processed, or disposed of, as desired.

The apparatuses (e.g., the TR membrane apparatus 100, including the TR membrane 104 thereof), systems (e.g., the fluid treatment system 200 (FIG. 2)), and methods of the disclosure facilitate simple and efficient treatment of a feed fluid (e.g., the feed fluid stream 210 (FIG. 2)) to selectivity separate one or more material(s) of the feed fluid from one or more other materials of the feed fluid. The apparatuses, systems, and methods of the disclosure reduce one or more of the time, costs, and energy (e.g., thermal energy, electrical energy, etc.) required to treat the feed fluid as compared to conventional apparatuses, conventional systems, and conventional methods. Accordingly, the apparatuses, systems, and methods of the disclosure may be more efficient (e.g., increasing material separation efficiency; reducing equipment, material, and/or energy requirements; etc.), durable, and reliable than conventional apparatuses, conventional systems, and conventional methods for treating a feed fluid to selectivity separate one or more material(s) of the feed fluid from one or more other material(s) of the feed fluid.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A thermally reflective membrane apparatus, comprising:
   a housing structure; and
   a thermally reflective membrane positioned between a feed region and a permeate region of an internal chamber of the housing structure, the thermally reflective membrane comprising:
      a semipermeable structure; and
      a porous, thermally reflective structure on a side of the permeate region of the internal chamber and physically contacting the semipermeable structure, the porous, thermally reflective structure comprising:
         discrete thermally reflective particles; and
         a binder material coupling the discrete thermally reflective particles to one another and the semipermeable structure.

2. The thermally reflective membrane apparatus of claim 1, wherein the discrete thermally reflective particles comprise a material that reflects wavelengths of electromagnetic radiation within a range of from about 700 nm to about 1500 nm.

3. The thermally reflective membrane apparatus of claim 1, wherein the discrete thermally reflective particles each individually have a particle size within a range of from about 0.25 µm to about 25 µm.

4. The thermally reflective membrane apparatus of claim 3, wherein the discrete thermally reflective particles have a multi-modal particle size distribution.

5. The thermally reflective membrane apparatus of claim 1, wherein the discrete thermally reflective particles are hydrophobic.

6. The thermally reflective membrane apparatus of claim 1, wherein the porous, thermally reflective structure is located on an outer surface of the semipermeable structure.

7. The thermally reflective membrane apparatus of claim 1, wherein the porous, thermally reflective structure is embedded within the semipermeable structure.

8. The thermally reflective membrane apparatus of claim 1, wherein the thermally reflective membrane exhibits one or more of a flat sheet shape, a hollow fiber shape, a tubular shape, a spiraled shape, and a honeycomb shape.

9. The thermally reflective membrane apparatus of claim 1, further comprising a thermal isolation structure within the feed region of an internal chamber of the housing structure adjacent a first side of the thermally reflective membrane, the thermal isolation structure spaced apart from the thermally reflective membrane and comprising a thermally reflective material.

10. The thermally reflective membrane apparatus of claim 9, further comprising a cooling device within the permeate region of an internal chamber of the housing structure adjacent a second side of the thermally reflective membrane opposing the first side of the thermally reflective membrane, the cooling device spaced apart from the thermally reflective membrane.

11. A fluid treatment system, comprising:
    a feed fluid source configured to produce a feed fluid stream comprising multiple materials;
    a heat transfer apparatus configured and positioned to receive the feed fluid stream from the feed fluid source and to influence a temperature of the feed fluid stream; and
    a thermally reflective membrane apparatus downstream of the feed fluid source and the heat transfer apparatus, the thermally reflective membrane apparatus comprising:
       a housing structure; and
       a thermally reflective membrane positioned between a feed region and a permeate region of an internal chamber of the housing structure, the permeate region of the internal chamber defining a cavity spaced apart from the thermally reflective membrane, and the thermally reflective membrane comprising:
          a semipermeable structure; and
          a porous, thermally reflective structure physically contacting the semipermeable structure and comprising:
             discrete thermally reflective particles; and
             a binder material coupling the discrete thermally reflective particles to one another and the semipermeable structure.

12. The fluid treatment system of claim 11, wherein the feed region of the internal chamber of the housing structure is configured and positioned to receive the feed fluid stream.

13. The fluid treatment system of claim 12, wherein the thermally reflective membrane apparatus further comprises a thermally reflective structure within the feed region of the internal chamber of the housing structure and separated, from the porous, thermally reflective structure.

14. The fluid treatment system of claim 12, further comprising an additional fluid source configured to produce an additional fluid stream, the permeate region of the internal chamber of the housing structure configured and positioned to receive the additional fluid stream.

15. The fluid treatment system of claim 12, further comprising a cooling device within, upstream of, or downstream of the permeate region of the internal chamber of the housing structure.

16. The fluid treatment system of claim 11, wherein the semipermeable structure and the discrete thermally reflective particles of the porous, thermally reflective structure are hydrophobic.

17. The fluid treatment system of claim 11, further comprising an energy source operatively coupled to the heat transfer apparatus, the energy source configured and operated to utilize one or more of solar thermal energy, wind energy, hydropower energy, geothermal energy, nuclear energy, fuel cell energy, combustion-based energy, waste heat, and recovered heat.

18. A method of treating a fluid, comprising:
introducing a feed fluid stream comprising multiple materials to a first side of a thermally, reflective membrane positioned between a feed region and a permeate region of an internal chamber of a housing structure the thermally reflective membrane comprising a semipermeable structure and a porous, thermally reflective structure comprising discrete thermally reflective particles and a binder material coupling the discrete thermally reflective particles to one another and the semipermeable structure, the thermally reflective structure on a side of the permeate region of the internal chamber and physically contacting the semipermeable structure, the first side of the thermally reflective membrane having a greater temperature than a second, opposing side of the thermally reflective membrane; and
transferring one or more of the multiple materials of the feed fluid stream through the thermally reflective membrane and to the second, opposing side of the thermally reflective membrane using membrane distillation.

19. The method of claim 18, further comprising:
selecting the feed fluid stream to comprise an aqueous solution; and
selecting the thermally reflective membrane to comprise:
a hydrophobic semipermeable structure; and,
the porous, thermally reflective structure physically contacting the hydrophobic semipermeable structure and comprising:
hydrophobic, thermally reflective particles; and
a binder material coupling the hydrophobic, thermally reflective particles to one another and the semipermeable structure.

20. The method of claim 18, further comprising employing one or more of solar thermal energy, wind energy, hydropower energy, geothermal energy, nuclear energy, fuel cell energy, combustion-based energy, waste heat, and recovered heat to heat the feed fluid stream prior to introducing the feed fluid stream to the first side of the thermally reflective membrane.

\* \* \* \* \*

UNITED STATES PATENT AND TRADEMARK OFFICE
CERTIFICATE OF CORRECTION

PATENT NO. : 11,925,902 B2
APPLICATION NO. : 17/009421
DATED : March 12, 2024
INVENTOR(S) : John R. Klaehn et al.

It is certified that error appears in the above-identified patent and that said Letters Patent is hereby corrected as shown below:

In the Specification

| | | | |
|---|---|---|---|
| | Column 1, | Line 17, | change "DE-AC07-051D14517 awarded" to --DE-AC07-05ID14517 awarded-- |
| | Column 5, | Lines 55-56, | change "the mated al(s) of" to --the material(s) of-- |
| | Column 7, | Line 48, | change "materials) within" to --material(s) within-- |
| | Column 9, | Line 63, | change "materials) (e.g.," to --material(s) (e.g.,-- |
| | Column 15, | Line 32, | change "dioxide (SC CO$_2$)." to --dioxide (ScCO$_2$)).-- |
| | Column 18, | Line 66, | change "(e.g,, vapor)" to --(e.g., vapor)-- |

In the Claims

| | | | |
|---|---|---|---|
| Claim 13, | Column 22, | Lines 51-52, | change "and separated, from" to --and separated from-- |
| Claim 18, | Column 23, | Line 8, | change "thermally, reflective" to --thermally reflective-- |
| Claim 18, | Column 23, | Line 10, | change "structure the" to --structure, the-- |
| Claim 19, | Column 24, | Line 7, | change "structure; and," to --structure; and-- |

Signed and Sealed this
Twenty-fifth Day of June, 2024

Katherine Kelly Vidal
*Director of the United States Patent and Trademark Office*